Sept. 18, 1956 M. VIDALENQ 2,763,764
ELECTRIC WATER HEATERS OF THE ACCUMULATOR TYPE
Filed Sept. 29, 1953
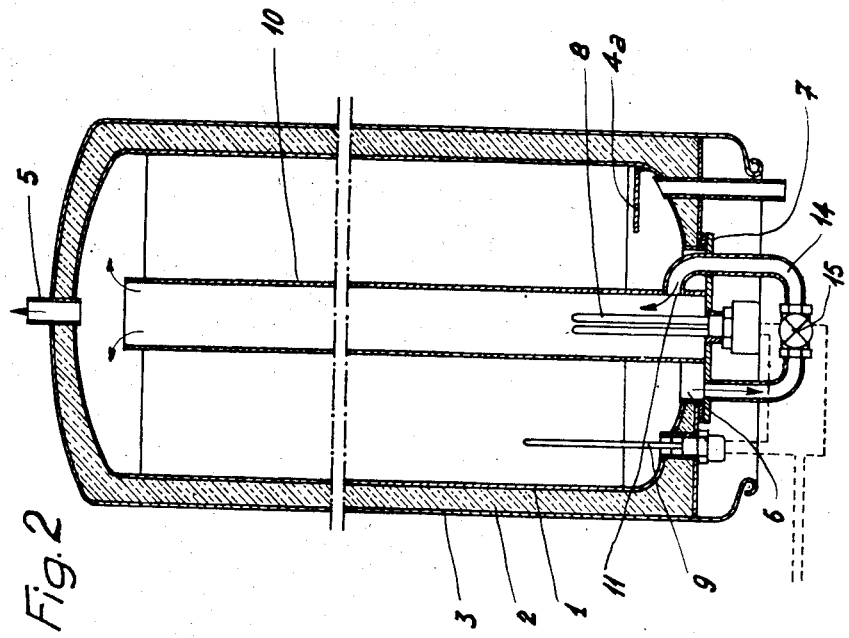
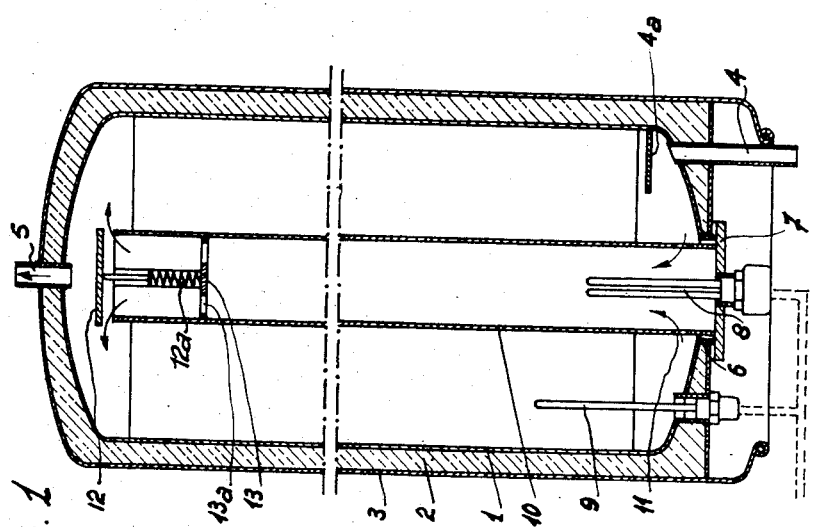

United States Patent Office 2,763,764
Patented Sept. 18, 1956

2,763,764
ELECTRIC WATER HEATERS OF THE ACCUMULATOR TYPE

Maurice Vidalenq, Paris, France

Application September 29, 1953, Serial No. 383,030

Claims priority, application France July 6, 1953

2 Claims. (Cl. 219—38)

It is well known that electric water heaters of the accumulator type consist, in general, of a thermally-insulated vertical reservoir, in the lower portion of which are arranged one or a number of heating elements and a thermostat.

The water contained in the reservoir is slowly heated up to the temperature (of the order of 80°) at which the thermostat is set, the time taken to reach that temperature being several hours. The user can thus only make use of his water heater following a fairly long period after it has been switched on, and this is a disadvantage.

Attempts have been made to remedy this by arranging in the upper portion of the water heater, and generally in the upper third or quarter of the reservoir, an auxiliary heating element associated with a thermostat, to which the current is switched over when it is desired to use a limited quantity of hot water within a very short time.

This arrangement complicates the apparatus and its accessories and considerably reduce it utility.

The present invention has for its object an improvement in electric water heaters of the kind referred to above by means of which it is possible, in a very simple manner and within a very short time after switching the apparatus into use and even at any moment after it has been switched on, to draw from the apparatus water at a high temperature.

This improvement consists in arranging inside the reservoir a chamber of smaller transverse cross-section, which is separated from the remainder of the reservoir by a wall made of material which is a poor conductor of heat, this chamber communicating with the reservoir at its lower portion and its upper portion having its outlet in the vicinity of the hot water outlet pipe, the chamber being subjected to the action of at least one heating element.

Automatic or manual control means may be provided to control the operation of the chamber, for example by acting on its inlet portion or its outlet.

The chamber may be constituted in a very simple way by a vertical tube made of suitable material, for example in asbestos cement, which starts from the base of the reservoir and stops at a short distance from the top of the latter, the heating elements being arranged within the interior of this tube.

The description which follows below with respect to the attached drawings (which are given by way of example only and not in any sense by way of limitation) will make it quite clear how the invention may be carried into effect, the special features which are referred to, either in the drawings or in the text, being understood to form a part of the said invention.

Fig. 1 is a vertical cross-section of a first form of embodiment of the invention.

Fig. 2 is a similar view of an alternative form.

In the form of embodiment shown in the drawing, the water heater consists of a reservoir 1 which is surrounded by a thermal insulation jacket 2 covered by a casing 3. In the lower portion of the reservoir, there is provided a cold water supply pipe 4 with which there is associated a baffle-plate 4a. An outlet pipe 5 for the hot water is provided in the upper portion.

The base of the reservoir comprises an opening 6 which is closed off by a plate 7 carrying at its central portion of the heating elements 8 which are connected to a suitable current supply through the intermediary of a thermostat 9 mounted in the lower portion of the reservoir.

The plate 7 carries a tube 10 of insulating material, for example of asbestos cement, which surrounds the heating elements 8. This tube communicates with the reservoir at its lower portion by means of one or a number of orifices 11; at its upper extremity, it is open in the vicinity of the pipe 5.

The operation of the apparatus which has just been described is as follows:

When the reservoir is filled with cold water and the heating elements are supplied with current, the latter transmit their heat to the water which surrounds them inside the tube 10. The heated water rises inside this tube in which it is replaced by cold water which passes in through the orifice or orifices 11 and is heated in its turn. There is thus produced in the apparatus a circulation of water by a thermo-siphon effect. The hot water which, by reason of its ascending path inside the tube 10 of bad heat-conducting material, is not subjected to any appreciable cooling effect, accumulates in the upper portion of the reservoir and progressively forces the cold water towards the heating elements.

As soon as the hot water has descended to the level of the thermostat, the heating is stopped.

With the present apparatus, the user can draw-off hot water from the pipe 5 only a very short time after the heating elements have been switched on, which could not be done if the tube 10 were not provided, since the hot water would become mixed with the cold water as it rose freely and would thus be cooled by giving up its heat to the cold water.

The temperature at which the water leaves the tube 10 in order to accumulate in the upper portion of the apparatus, depends, inter alia, on the rapidity of the circulation which is set up wtihin this tube. It is possible to control the said circulation in several ways.

Fig. 1 is concerned with an automatic control device.

At its upper extremity, the tube 1 carries a thermostatic clack-valve 12, for example fo the expansion type, mounted on a transverse cover member 13 pierced with holes 13a. This clack-valve is adjusted so that it only opens when it is in contact with water at a pre-determined temperature, for example 80°. This thermostatic clack valve includes a thermostatic element 12a located within the upper end of tube 10.

When the water heater is put into use, the clack-valve 12 is closed. The water contained in the tube 10 is thus heated as in a closed container and the temperature of the water surrounding the thermo-sensitive element of the clack-valve rapidly rises to the value at which the regulator has been set. At that moment, the clack-valve opens and hot water at the desired temperature passes out of the tube and spreads over the upper part of the reservoir. The circulation is then started up until the thermostat 9 cuts off the current supply.

The form of the embodiment shown in Fig. 2 is provided with a regulating device for manual operation which, in this case, acts on the inlet section of the cold water supply to the tube 10.

To this end, the orifice 11 of the tube 10 is connected to the lower cavity of the reservoir 1 by means of a pipe 14 provided with a valve 15, which piping may advantageously be mounted in the plate 7 which facilitates the construction and the dismantling of the apparatus. When in operation, the water circulates in the direction of the arrows. By acting upon the valve 15, the user may regulate the temperature at which the water passes out of the open upper portion of the tube 10.

It will be quite clear that modifications may be made to the form of embodiment which has just been described, in particular by the substitution of equivalent technical means, thereby departing from the spirit or from the scope of the present invention.

What I claim is:

1. An electric water heater of the accumulation type comprising in combination an upright thermally-insulated reservoir, inlet piping means at the bottom of said reservoir for supplying said reservoir from a source of water, outlet piping means at the top of said reservoir for drawing off water from said reservoir; an upright chamber disposed within said reservoir and having a cross-sectional area substantially less than that of said reservoir, the walls of said chamber being made of material which is a poor conductor of heat, said chamber being provided with an opening in its upper extremity, in the vicinity of said outlet piping means and with a passage formed in its walls near the base thereof; an electric heating element mounted in the base of and projecting within said chamber; and means, responsive to the temperature of the water, mounted in said chamber at the upper extremity thereof, for closing said opening when the temperature of the water in said extremity of the chamber is below a predetermined value, said means including a thermostatic element mounted within the upper end of said chamber.

2. An electric water heater of the accumulation type comprising in combination an upright thermally insulated reservoir having outlet piping means at the top; an upright chamber disposed within said reservoir and having a cross-sectional area substantially less than that of said reservoir, the walls of said chamber being made of material which is a poor conductor of heat, said chamber being provided with an opening in its upper extremity, in the vicinity of said outlet piping means; an electric heating element mounted in the base of and projecting within said chamber, inlet pipe means connected to the bottom of said reservoir, for supplying said reservoir from a source of water; a pipe connecting the bottom of said reservoir at a point opposite from said inlet pipe means with respect to said chamber to the lower portion of said chamber, said pipe having a portion located externally of said reservoir and a control valve in said external portion.

References Cited in the file of this patent

UNITED STATES PATENTS

| | | |
|---|---|---|
| 1,034,952 | Ball | Aug. 6, 1912 |
| 1,968,549 | Allen | July 31, 1934 |
| 2,411,675 | Alexander | Nov. 26, 1946 |
| 2,576,603 | Hines et al. | Nov. 27, 1951 |